(12) United States Patent
Sawada

(10) Patent No.: US 7,545,398 B2
(45) Date of Patent: Jun. 9, 2009

(54) DISPLAY DEVICE

(75) Inventor: Munenori Sawada, Suwa (JP)

(73) Assignee: Seiko Epson Corporation (JP)

( * ) Notice: Subject to any disclaimer, the term of this patent is extended or adjusted under 35 U.S.C. 154(b) by 615 days.

(21) Appl. No.: 10/985,643

(22) Filed: Nov. 11, 2004

(65) Prior Publication Data

US 2005/0184975 A1    Aug. 25, 2005

(30) Foreign Application Priority Data

Nov. 28, 2003    (JP)    ............... 2003-400028

(51) Int. Cl.
*G09G 5/00*    (2006.01)

(52) U.S. Cl. .................. 345/901; 705/14; 345/87; 345/211; 345/97; 345/107; 345/204

(58) Field of Classification Search .......... 345/204, 345/901, 85, 107; 434/317
See application file for complete search history.

(56) References Cited

U.S. PATENT DOCUMENTS

| | | | | |
|---|---|---|---|---|
| 5,596,260 A | * | 1/1997 | Moravec et al. | 320/135 |
| 5,686,794 A | * | 11/1997 | Streppel et al. | 313/579 |
| 5,686,934 A | | 11/1997 | Nonoshita et al. | |
| 5,697,793 A | * | 12/1997 | Huffman et al. | 434/317 |
| 5,809,449 A | * | 9/1998 | Harper | 702/63 |
| 6,310,556 B1 | * | 10/2001 | Green et al. | 340/636.15 |
| 6,473,058 B1 | * | 10/2002 | Hotomi et al. | 345/1.1 |
| 6,788,283 B1 | * | 9/2004 | Blotky et al. | 345/156 |
| 6,870,349 B2 | * | 3/2005 | Cook | 320/132 |
| 7,057,591 B1 | * | 6/2006 | Hautanen et al. | 345/87 |
| 7,088,355 B1 | * | 8/2006 | Ochi | 345/211 |
| 2004/0046705 A1 | * | 3/2004 | Masazumi et al. | 345/1.1 |

FOREIGN PATENT DOCUMENTS

| | | |
|---|---|---|
| JP | 05-035197 | 2/1993 |
| JP | 09-284432 | 10/1997 |
| JP | 10/207585 | 8/1998 |
| JP | 2003-233443 | 8/2003 |
| JP | 2004-170849 | 6/2004 |

* cited by examiner

*Primary Examiner*—Sumati Lefkowitz
*Assistant Examiner*—Grant D Sitta
(74) *Attorney, Agent, or Firm*—Harness, Dickey & Pierce, P.L.C.

(57) ABSTRACT

There is provided a battery-driven electronic book reader for switchingly displaying each page of contents separated in predetermined pages on a cholesteric liquid crystal panel, wherein a remaining available battery level is detected (step S102), the number of pages to be switchedly displayed on the cholesteric liquid crystal panel is calculated based on the detected remaining available battery level (step S104), and the calculated number of pages is displayed on the cholesteric liquid crystal panel (step 105).

16 Claims, 8 Drawing Sheets

| DRIVING METHOD | TEMPERATURE | POWER CONSUMPTION FOR ONE PAGE |
|---|---|---|
| DRIVING METHOD1 | 0°C | AmW |
| | 10°C | BmW |
| | ... | ... |
| | 60°C | CmW |
| DRIVING METHOD2 | 0°C | DmW |
| | 10°C | EmW |
| | ... | ... |
| | 60°C | FmW |

DISPLAY DEVICE

BACKGROUND OF THE INVENTION

1. Field of the Invention

The present invention relates to a battery-driven type display device for switchingly displaying each page of contents to be displayed onto a storage-type display unit, that is, a display unit capable of holding contents which has been displayed thereon even if power supply is stopped.

2. Description of the Related Art

As a display device of this kind, there has been known a display device for electronic books which switchingly displays each page of contents, such as a book, separated in predetermined pages onto a storage-type display unit, such as a cholesteric liquid crystal or electrophoretic display unit, and enables a user to browse the contents, for example, as described in JP2003-233443A.

For example, a mobile telephone is also known which immediately displays a remaining battery level on its display to prompt exchange or charging of the battery. A notebook computer is also known which displays available time corresponding to a remaining battery level on its display.

In the case of a display device which switchingly displays each page of contents on a storage-type display unit and displays a remaining battery level, a display device realized by combination of the above prior-art techniques, even if a low remaining battery level is displayed while a user is browsing contents, it is difficult for him to determine whether or not he can finish reading remaining pages with the current low remaining battery level.

Furthermore, since the display device using a storage-type display unit consumes power only when switching display is performed, it is impossible to specify available time corresponding to a remaining battery level.

The present invention has been made in consideration of the unsolved problems of the prior-art techniques, and its object is to provide a display device which makes a remaining battery level notification appropriate for a storage-type display unit.

SUMMARY OF THE INVENTION

In order to achieve the above object, a display device of a first invention is a display device driven with a battery, for switchingly displaying each page of contents to be displayed on a storage-type display unit; the display device comprising: a remaining battery level detection section for detecting a remaining battery level and a notification section for notifying a correspondence relation between the detected remaining battery level and the number of displayable pages of the contents.

In a display device of a second invention, the notification section notifies a user of the correspondence relation when the user selects contents to be displayed on the storage-type display unit.

Furthermore, in a display device of a third invention, the notification section calculates power consumption required for switchingly displaying remaining pages of contents displayed on the storage-type display unit and makes the notification based on the calculation result and the remaining battery level detected by the remaining battery level detection section.

In a display device of a fourth invention, when a value obtained by subtracting the calculated power consumption from the remaining battery level detected by the remaining battery level detection section is a predetermined threshold or below, the notification section makes a notification to that effect.

Furthermore, a display device of a fifth invention comprises a display operation limiting section for enabling switching display from a page displayed on the storage-type display unit only to the next page when the value obtained by subtracting the calculated power consumption from the remaining battery level detected by the remaining battery level detection section is a predetermined threshold or below.

In a display device of a sixth invention, the notification section calculates the maximum number of pages to be switchedly displayed on the storage-type display unit, based on the remaining battery level detected by the remaining battery level detection section and makes the notification based on the calculated number of pages.

In a display device of a seventh invention, when the calculated number of pages is a reference number of pages or larger, the notification section makes a notification to that effect.

In a display device of an eighth invention, it is possible to set multiple values of the reference number of pages.

In a display device of a ninth invention, when the calculated number of pages is smaller than the smallest reference number of pages among the multiple values of the reference number of pages, the notification section immediately notifies the calculated number of pages.

According to the first to ninth inventions, it is possible to provide an indication from which a user can determine whether or not he can finish reading remaining pages of contents with the current remaining battery level, that is, a notification of a remaining battery level which is appropriate for a storage-type display unit.

According to the fourth invention, it is possible to inhibit a user from performing operations other than switching display of the next page, and thereby it is possible to prevent power from being consumed by the operations and enable the displayed contents to be switchedly displayed to the last page.

According to the fifth invention, it is possible to inhibit power from being consumed by operations other than switching display of the next page, and thereby it is possible to enable the displayed contents to be switchedly displayed to the last page.

A display device of a tenth invention comprises a power consumption calculation section for calculating power consumed by the switching display, based on change in the remaining battery level detected by the remaining battery level detection section, and the notification section calculates the number of pages to be switchedly displayed on the storage-type display unit, based on the remaining battery level detected by the remaining battery level by the remaining battery level detection section and the calculated power consumption calculated by the power consumption calculation section.

In a display device of an eleventh invention, the notification section calculates the number of pages to be switchedly displayed on the storage-type display unit based on the remaining battery level detected by the remaining battery level detection section and a method of driving the storage-type display unit.

A display device of a twelfth invention comprises a temperature detection section for detecting temperature of the storage-type display unit, and the notification section calculates the number of pages to be switchedly displayed on the storage-type display unit based on the remaining battery level detected by the remaining battery level detection section and the temperature detected by the temperature detection section.

A display device of a thirteenth invention comprises a battery for a particular circuit for supplying power to a particular circuit the power consumption of which changes with operation time and a battery used for the switching display, and the remaining battery level detection section detects a remaining level of the battery used for the switching display.

In a display device of a fourteenth invention, a non-volatile memory is used as a memory used for storage of data generated by control processing of the display device.

According to the tenth to fourteenth inventions, it is possible to appropriately calculate power consumed by a storage-type display unit and accurately calculate the number of pages to be switchedly displayed on the storage-type display unit.

DETAILED DESCRIPTION OF THE PREFERRED EMBODIMENTS

An electronic book reader for browsing contents of an electronic book separated in predetermined pages will be described below as an image display device according to the present invention, with reference to drawings.

Figure 1:
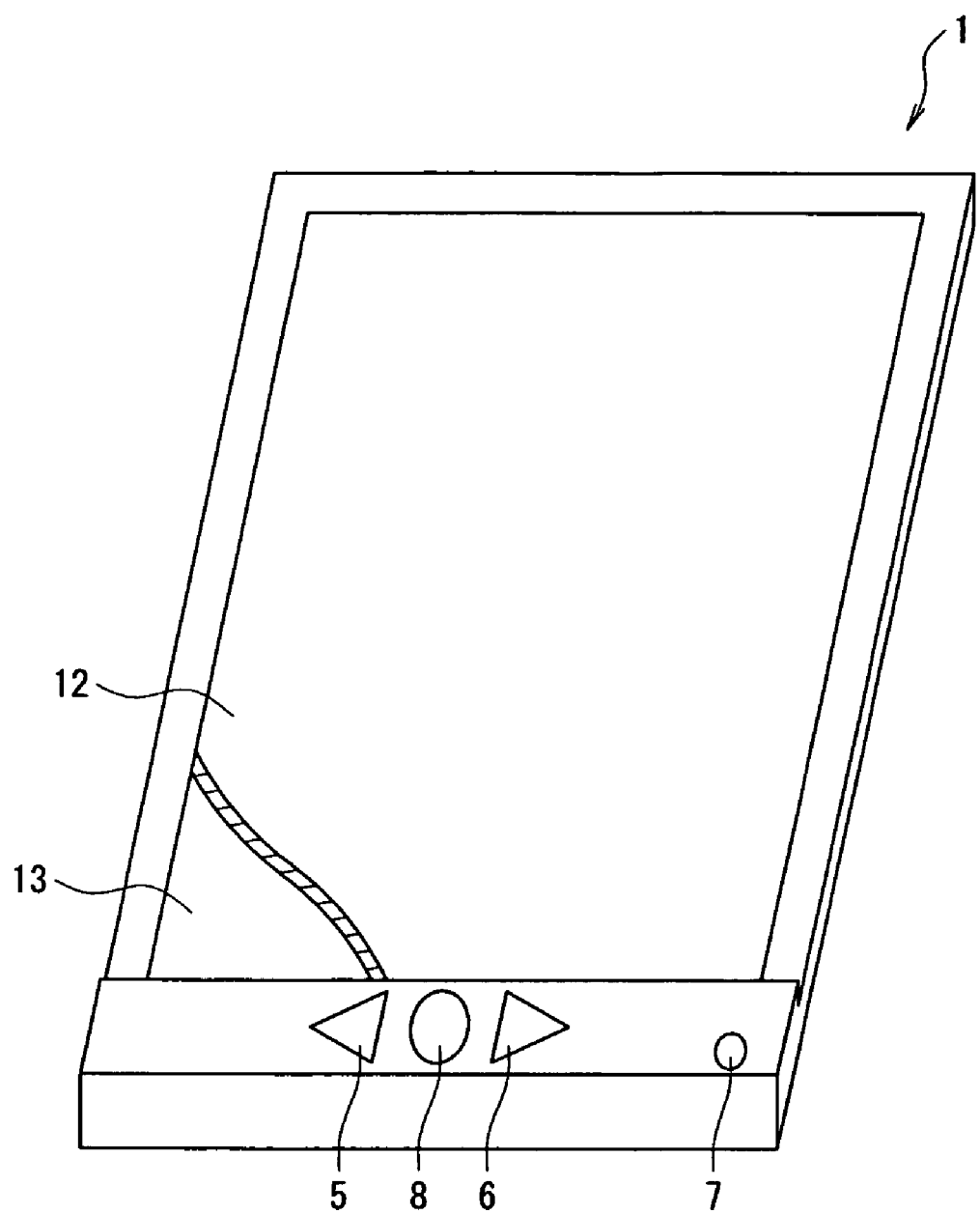
FIG. 1 is a schematic block diagram of an electronic book reader of an embodiment the present invention.
Figure 2:
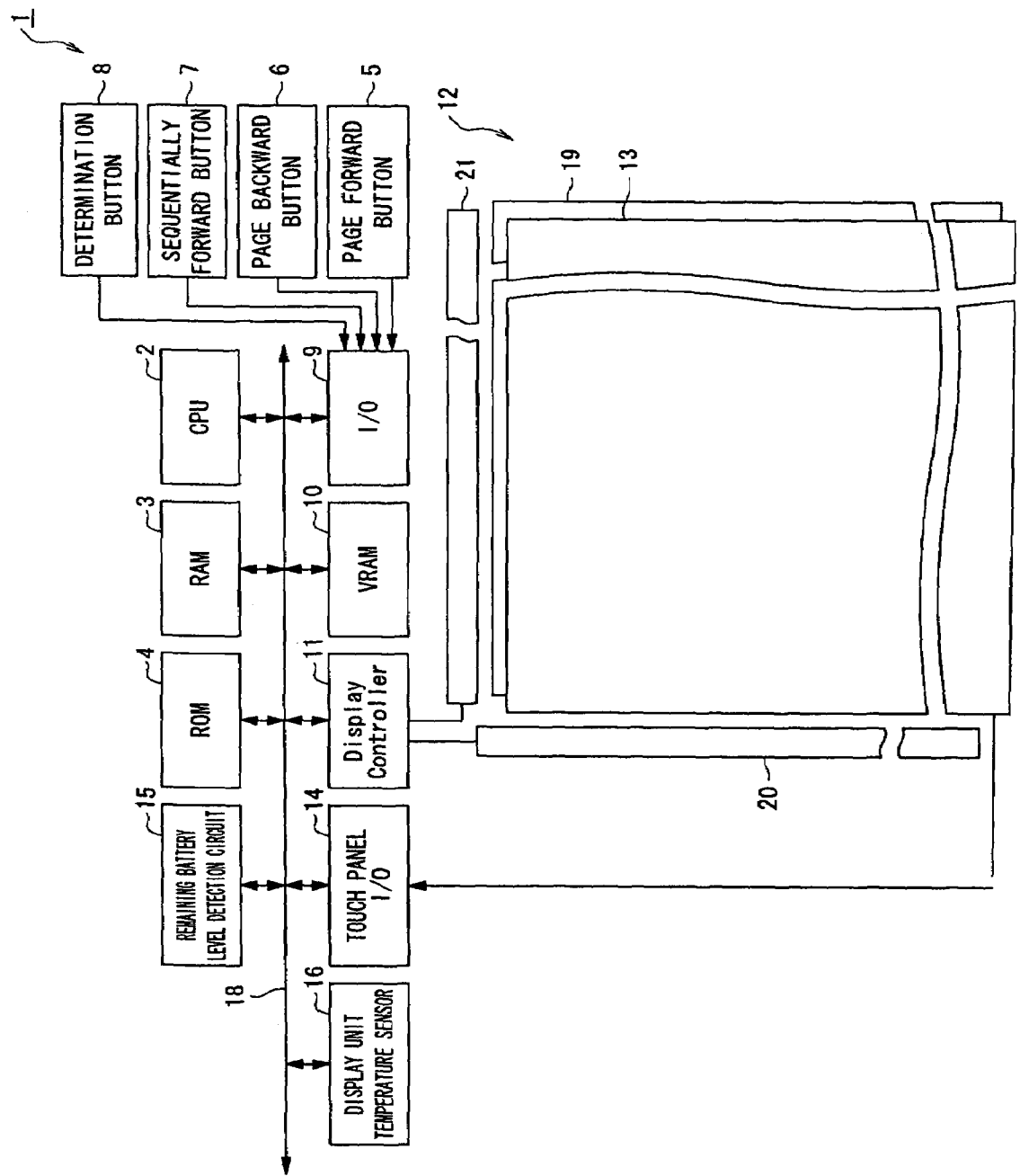
FIG. 2 is a block diagram showing the internal configuration of the electronic book reader of FIG. 1.

FIG. 1 is a schematic block diagram showing the external view of an embodiment of the present invention, and FIG. 2 is a block diagram showing the internal configuration of the embodiment of the present invention. As shown in FIG. 2, an electronic book reader 1 is configured to include a CPU (central processing unit) 2, a RAM (random access memory) 3, a ROM 4, an I/O 9 to which a page forward button 5, a page backward button 6, a sequentially forward button 7 and a determination button 8 are connected, a VRAM (video ram) 10, a display controller 11, a display device 12, a touch panel I/O 14 to which a touch panel 13 is connected, a remaining battery level detection circuit 15 and a display unit temperature sensor 16. The portions except the page forward button 5, the page backward button 6, the sequentially forward button 7, the determination button 8, the display device 12, the touch panel 13 and the temperature sensor for display unit temperature sensor 16, are mutually connected via a bus 18 in a manner that a signal can be sent and received there among.

Among these, the CPU 2 reads various programs, such as a primary control program and application programs, and data stored in the ROM 4; develops or executes the various programs and data in a work area provided in the RAM 3; and executes control of each portion provided for the electronic book reader. When a page forward signal to be described later is outputted from the I/O 9, the CPU 2 generates image data (which may be referred to as raster data hereinafter) of contents of the page next to the contents displayed on the display device 12 and causes the raster data to be stored in the VRAM 10.

Furthermore, when a page backward signal to be described later is outputted from the I/O 9, the CPU 2 generates raster data of the contents of the page previous to the contents displayed on the display device 12 and causes the raster data to be stored in the VRAM 10. When a sequentially forward signal to be described later is outputted from the I/O 9, the CPU 2 sequentially generates raster data of contents of the page next to the contents displayed on the display device 12 and causes the raster data to be sequentially stored in the VRAM 10.

Furthermore, every time any of the page forward button 5, the page backward button 6, the sequentially forward button 7 and the determination button 8 is pressed down, the CPU 2 executes a number-of-displayable-pages displaying process to be described later; generates raster data of an image showing the number of pages which can be displayed with the current driving remaining battery level (the number of displayable pages); and causes the raster data to be stored in the VRAM 10.

Furthermore, every time any of the page forward button 5, the page backward button 6, the sequentially forward button 7 and the determination button 8 is pressed down, the CPU 2 executes a display operation limiting process to be described later. When a subtraction result obtained by subtracting power consumption required for switchingly displaying remaining pages of contents from a remaining available driving battery level is a predetermined threshold or below, the CPU 2 outputs an inhibiting signal to inhibit the I/O 9 from outputting the page backward signal and outputting the sequentially forward signal to be described later.

When the CPU 2 executes the above processes in accordance with various programs, the RAM 3 forms a work area on which the various programs are to be developed. The RAM 3 also forms a memory area on which data related to various processes executed by the CPU 2 is to be developed. As the RAM 3, a non-volatile memory such as an FeRAM (ferroelectric random access memory) and an MRAM (magnetoresistive random access memory) is used.

As described above, in the electronic book reader 1 of this embodiment, a non-volatile memory is used as the RAM 3. Therefore, it is possible to keep power consumed by the RAM 3 for displaying one page of contents corresponding to one page constant, irrespective of time spent by a user for browsing the contents, and thereby it is possible to easily calculate the number of displayable pages.

In the case of a method using a non-volatile memory such as DRAM which consumes power supplied by a driving battery as the RAM 3, the power consumed by the RAM 3 changes according to time spent for browsing contents, and it is difficult to accurately calculate the number of displayable pages.

The ROM 4 stores a primary control program and various programs to be executed by the CPU 2 and data related to these programs. The ROM 4 outputs these various programs or the data to the CPU 2 in response to a read request from the CPU 2. All the various programs and the data in the ROM 4 are stored in a form which can be read and executed by the CPU 2.

The page forward button 5 for switchingly displaying the contents of the next page on the display device 12, the page backward button 6 for switchingly displaying the contents of the previous page on the display device 12, the sequentially forward button 7 for switchingly displaying the contents of the next page on the display device 12 sequentially and the determination button 8 are connected to the I/O 9. When the page forward button 5 is pressed down, the I/O 9 outputs a page forward signal to the CPU 2. The I/O 9 determines whether or not an inhibiting signal is outputted from the CPU 2. If an inhibiting signal is not outputted, the I/O 9 outputs a page backward signal to the CPU 2 in response to the page backward button 6 being pressed down, and outputs a sequentially forward signal to the CPU 2 in response to the sequentially forward button 7 being pressed down. On the contrary, if an inhibiting signal is outputted, output of a page backward signal and output of a sequentially forward signal are inhibited.

The VRAM 10 further stores raster data in response to a write request from the CPU 2. The VRAM 10 outputs the raster data to the display controller 11 in response to a read request from the display controller 11.

The display controller 11 reads the raster data stored in the VRAM 10 and generates data for driving a gate driver and data for driving a source driver based on the read raster data. The display controller 11 then distributes and outputs the generated data for driving a gate driver and the data for driving a source driver to a gate driver 20 and a source driver 21 of the display device 12, which are to be described later.

The display device 12 has a cholesteric liquid crystal panel 19 on which multiple pixels are formed in an array, that is, a panel constituted by liquid crystal capable of holding contents which has been displayed even after power supply is stopped, at the center thereof. On the left side of the plane of the cholesteric liquid crystal panel 19, the gate driver 20 is arranged. On the upper side of the plane, the source driver 21 is arranged. In the display device 12, the gate driver 20 and the source driver 21 apply a predetermined voltage to pixels in accordance with the data for driving a gate driver and the data for driving a source driver which are outputted from the display controller 11 to display an image of contents on the cholesteric liquid crystal panel 19. As a method for driving the cholesteric liquid crystal panel 19, a single-line driving method for performing rendering for each scan line and a multi-line driving method for performing rendering for multiple scan lines at the same time can be cited.

The touch panel 13 covering the front side of the cholesteric liquid crystal panel 19 is connected to the touch panel I/O 14. When the touch panel 13 is pressed down, the touch panel I/O 14 outputs a touch panel signal indicating the position of the pressing operation, to the CPU 2.

Figure 3:
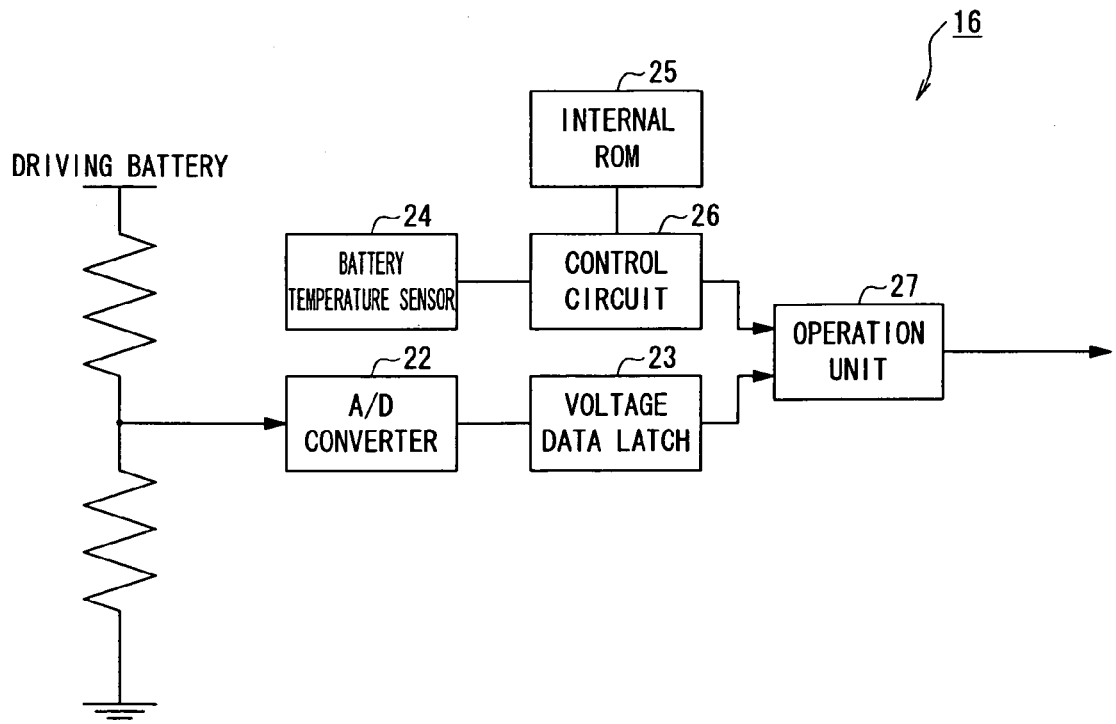
FIG. 3 is a block diagram showing the internal configuration of a remaining battery level detection circuit shown in FIG. 2.

As shown in FIG. 3, the remaining battery level detection circuit 15 is configured to include an A/D converter 22, a voltage data latch 23, a battery temperature sensor 24, an internal ROM 25, a control circuit 26 and an operation unit 27.

Among these, the A/D converter 22 detects voltage data of a driving battery of the electronic book reader 1 and digitizes the detected voltage data. The A/D converter 22 then outputs the digitized voltage to the voltage data latch 23.

The voltage data latch 23 latches the digitized voltage data outputted from the A/D converter 22 and outputs the latched voltage data to the operation unit 27.

The battery temperature sensor 24 detects the temperature of the driving battery of the electronic book reader 1 and outputs the detected temperature to the control circuit 26.

The internal ROM 25 stores the relation between the temperature of the driving battery of the electronic book reader 1 and a threshold voltage, that is, a control map showing temperature characteristics of the driving battery. The internal ROM 25 outputs the data of the control map to the control circuit 26 in response to a read request from the control circuit 26. All of the data of the control map in the internal ROM 25 is stored in a form which can be read by the control circuit 26.

The control circuit 26 references the control map stored in the internal ROM 25; calculates a threshold voltage of the driving battery of the electronic book reader 1 based on the temperature detected by the battery temperature sensor 24; and outputs the calculated threshold voltage to the operation unit 27.

The operation unit 27 calculates power which can be outputted by the driving battery of the electronic book reader 1, that is, a remaining available driving battery level based on the voltage data outputted from the voltage data latch 23 and the threshold voltage outputted from the control circuit 26, and then outputs the calculated remaining available driving battery level to the CPU 2.

As described above, in the electronic book reader 1 according to this embodiment, a remaining available driving battery level is calculated based on a control map indicating temperature characteristics of the driving battery of the electronic book reader 1, and thereby the remaining available driving battery level can be appropriately calculated.

The display unit temperature sensor 16 detects the temperature of the cholesteric liquid crystal panel 19 and outputs the detected temperature to the CPU 2 and the display controller 11. A thermister which exhibits significant resistance value change against temperature change is used as the display unit temperature sensor 16, and the temperature of the cholesteric liquid crystal panel 19 is detected by measuring the output voltage thereof.

Figure 4:
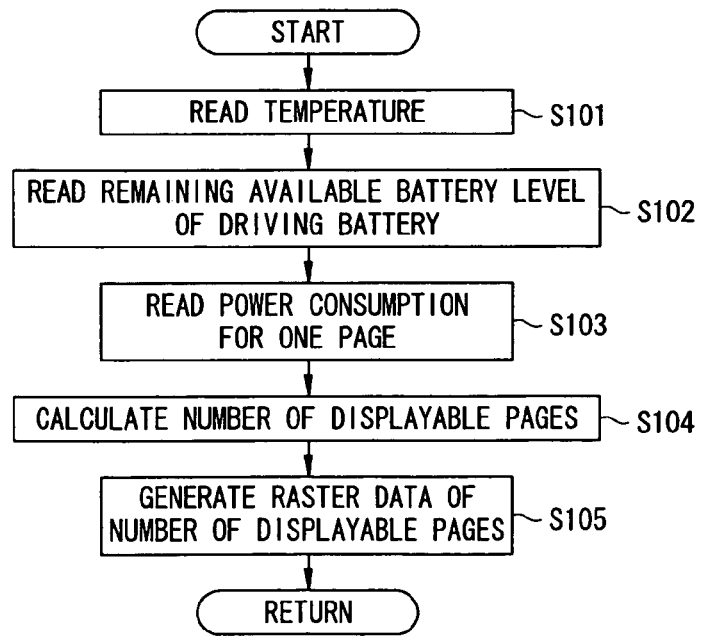
FIG. 4 is a flowchart showing a number-of-displayable-pages displaying process.

The number-of-displayable-pages displaying process for displaying the number of displayable pages on the display device 12 will be now described in accordance with the flowchart of FIG. 4. This number-of-displayable-pages displaying process is executed when any of the page forward button 5, the page backward button 6, the sequentially forward button 7 and the determination button 8 is pressed down. First, at step S101, the temperature of the cholesteric liquid crystal panel 19 detected by the display unit temperature sensor 16 is read.

Then, the process proceeds to S102, where the remaining available battery level of the driving battery of the electronic book reader 1, which has been detected by the remaining battery level detection circuit 15, is read.

Figures 5, 6:
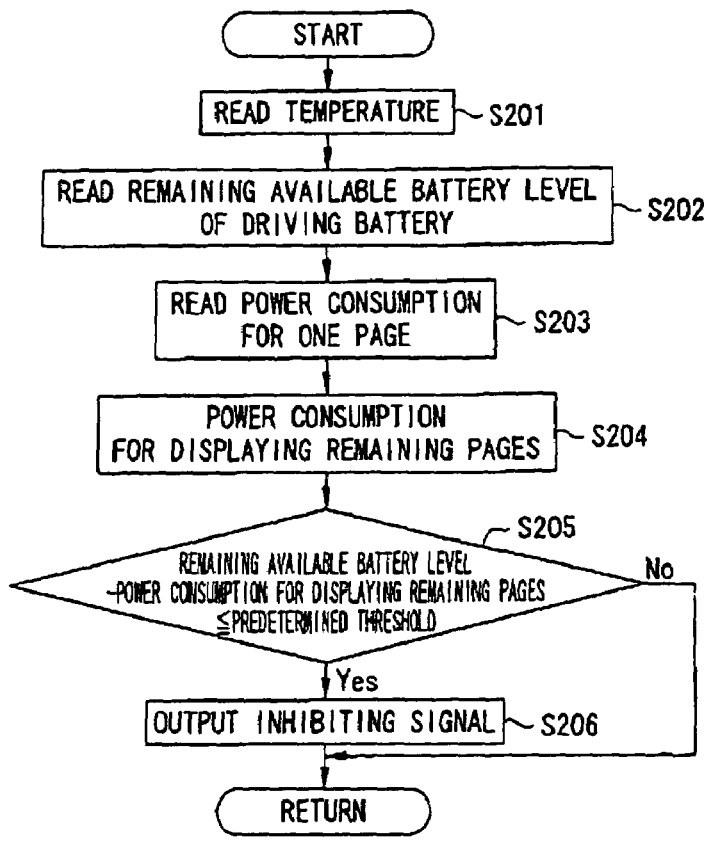
FIG. 5 shows a data table to be referenced by the number-of-displayable-pages displaying process of FIG. 4.
FIG. 6 is a flowchart showing a display operation limiting process.

Then, the process proceeds to S103, where the data table of FIG. 5 is referenced, and power required for switchingly displaying an image of contents corresponding to one page on the cholesteric liquid crystal panel 19 (power consumption for one page) is calculated based on the temperature read at the step S101. In the data table, values of power consumption for one page are set according to temperatures of the cholesteric liquid crystal panel 19 and driving methods, as shown in FIG. 5.

As described above, in the electronic book reader 1 of this embodiment, power consumption for one page is calculated based on the temperature of the cholesteric liquid crystal panel 19 and a driving method, and thereby it is possible to appropriately calculate power consumed by the cholesteric liquid crystal panel 19 and accurately calculate the number of pages which can be switchedly displayed on the cholestric liquid crystal panel 19.

The process then proceeds to step S104, where the remaining available driving battery level read at the step S102 is divided by the power consumption for one page read at the step S103, and the division result is determined to be the number of displayable pages.

The process then proceeds to step S105, where raster data of an image showing the number of displayable pages calculated at the step S104 is generated; the raster data is stored in the VRAM 10; and the processing is terminated.

Description will be now made on the display operation limiting process for inhibiting the I/O 9 from outputting a page back signal and a sequentially forward signal when a subtraction result obtained by subtracting power consumption required for switchingly displaying remaining pages of contents from a remaining available driving battery level is a predetermined threshold or below, in accordance with the flowchart of FIG. 6. The display operation limiting process is executed when any of the page forward button 5, the page backward button 6, the sequentially forward button 7 and the determination button 8 is pressed down. First, at step S201, the temperature of the cholesteric liquid crystal panel 19 detected by the display unit temperature sensor 16 is read.

The process then proceeds to step S202, where the remaining available battery level of the driving battery of the electronic book reader 1, which has been detected at the remaining battery level detection circuit 15, is read.

The process then proceeds to step S203, where the data table of FIG. 5 is referenced, and power consumption for one page is calculated based on the temperature read at the step S201.

Then, the process proceeds to step S204, where the number of remaining pages of contents displayed on the cholesteric liquid crystal panel 19 is multiplied by the power consumption required for rewriting one page, which has been detected at the step S203, and the multiplication result is determined as power required for switchingly displaying images of contents corresponding to the remaining pages on the cholestric liquid crystal panel 19 (power consumption for displaying remaining pages). The following is an example of a method for calculating the number of remaining pages of contents displayed on the cholesteric liquid crystal panel 19. That is, every time the contents of the next page is displayed, a dedicated counter is incremented, and every time the contents of the previous page are displayed, the dedicated counter is decremented. The incremented or decremented counter value of the dedicated counter is determined as the page number of the contents which is currently displayed, and a subtraction result obtained by subtracting the page number from the total number of pages of the contents is determined as the number of remaining pages.

Then, at step S205, the power consumption for displaying remaining pages, which has been calculated at the step S204, is subtracted from the remaining available driving battery level read at the step S202, and it is determined whether or not the subtraction result is a predetermined threshold or below. If it is the predetermined value or below (Yes), then the process proceeds to step S206, and otherwise (No) the processing is terminated.

At the step S206, an inhibiting signal for inhibiting the I/O 9 from outputting a page backward signal and outputting a sequentially forward signal is outputted to the I/O 9, and then the processing is terminated.

Next, the operation of the electronic book reader 1 of this embodiment will be described based on a specific situation.

Assume that a user has pressed down the page forward button 5. Then, the number-of-displayable-pages displaying process is executed by the CPU 2. As shown in FIG. 4, first at step S101, the temperature of the cholesteric liquid crystal panel 19 is read, and at step S102, the remaining available battery level of the driving battery of the electronic book reader is read. At step S103, the data table of FIG. 5 is referenced, and the power consumption for one page is calculated based on the temperature. At step S104, the remaining available driving battery level is divided by the power consumption for one page, and the division result is determined as the number of displayable pages. Then, at step S105, raster data of an image showing the number of displayable pages is generated; the raster data is stored in the VRAM 10; and the processing is terminated.

Figure 7:
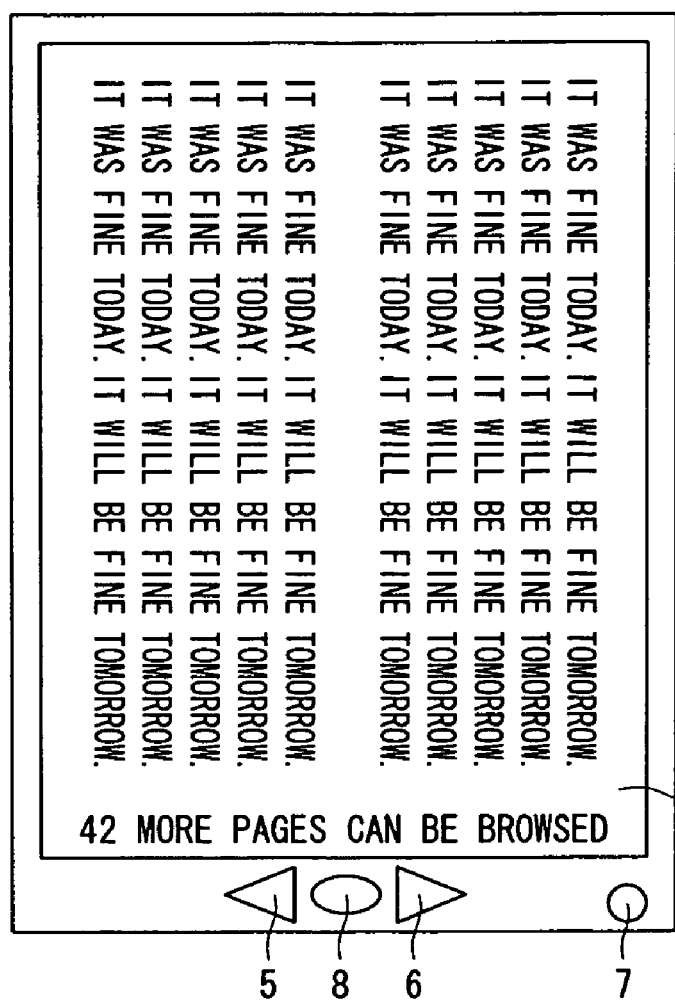
FIG. 7 illustrates the operation of the embodiment.

Then, the raster data stored in the VRAM 10 is read by the display controller 11, and data for driving a gate driver and data for driving a source driver are generated based on the read raster data. The magnitude of the driving power included in the generated data for driving a gate driver and data for driving a source driver is corrected based on the temperature detected by the display unit temperature sensor 16, and the correction result is distributed and outputted to the gate driver 20 and the source driver 21 of the display device 12. In the display device 12, a predetermined voltage is applied to pixels by the gate driver 20 and the source driver 21 in accordance with the data for driving a gate driver and the data for driving a source driver, and an image showing the number of displayable pages is displayed on the cholesteric liquid crystal panel 19, as shown in FIG. 7.

As described above, the electronic book reader 1 makes it possible to provide display which enables a user to easily determine whether or not he can finish reading remaining pages of the contents he is browsing, with the current remaining battery level, that is, to provide a remaining battery level notification suitable for a storage-type display unit. Accordingly, if there are only small number of pages which can be switchedly displayed with the remaining available driving battery level, for example, the user can adopt an appropriate browsing way corresponding to the remaining available driving battery level, such as a browsing way in which operations other than a page forward operation are avoided as far as possible.

At the same time, the display operation limiting process is executed by the CPU 2. As shown in FIG. 6, first at step S201, the temperature of the cholesteric liquid crystal panel 19 is read, and at step S202, the available remaining battery level of the driving battery of the electronic book reader is read. At step S203, the data table of FIG. 5 is referenced, and the power consumption for one page is calculated based on the temperature. At step S204, the number of remaining pages of the displayed contents is multiplied by the power consumption required for rewriting one page, and the multiplication result is determined as the power consumption required for displaying remaining pages. If a subtraction result obtained by subtracting the power consumption required for displaying remaining pages from the remaining available driving battery level is a predetermined threshold or below, the determination at step S205 is "Yes". At step S206, an inhibiting signal is outputted to the I/O 9, and the processing is terminated.

As described above, the electronic book reader 1 of this embodiment makes it possible to inhibit a previous page from being switchedly displayed and decrease power consumed by operations other than the operation of switchingly displaying the next page, and thereby makes it possible to switchingly display the browsed contents to the last page. Even when all the pages of the contents being browsed cannot be displayed with the remaining available driving battery level, it is possible to display as many pages as possible.

According to the embodiment described above, the remaining battery level detection circuit 15 of FIG. 2 and the step S102 of FIG. 3 comprise a remaining battery level detection section. Similarly, the CPU 2 of FIG. 2 and the step S104 of FIG. 3 comprise a page number calculation section; the step S105 of FIG. 3 comprises a notification section, the display unit temperature sensor 16 of FIG. 2 comprises a temperature detection section, the step S204 of FIG. 6 comprises a third power consumption calculation section, the step S206 of FIG. 6 comprises a display operation limiting section, the RAM 3 of FIG. 2 comprises a contents data storage section, and the CPU 2 of FIG. 2 comprises a display control section.

The display device of the present invention is not limited to the contents of the embodiment described above, and it is appropriately changeable within a range not departing from the spirit of the present invention.

For example, in the above embodiment, an example has been shown in which the remaining available driving battery level is calculated based on the voltage of the driving battery of the electronic book reader 1. However, the display device of the present invention is not limited thereto. For example, the remaining available driving battery level may be calculated by periodically detecting the voltage applied to the resistance for current detection by means of the A/D converter 22, sequentially adding the current obtained for each detection and subtracting the sequentially added current from the total available current of the driving battery.

Though an example has been shown in which a cholesteric liquid crystal panel 19 is used, the display device of the present invention is not limited thereto. For example, other storage-type display bodies, such as an electrophoretic display, may be used.

Furthermore, a battery for a particular circuit may be provided which supplies power to a particular circuit such as a touch panel 13, a touch panel I/O 14, and a display unit temperature sensor 16, having its power consumption which changes according to time spent for use of the electronic book reader 1, separately from the driving battery of the electronic book reader 1.

Figure 8:
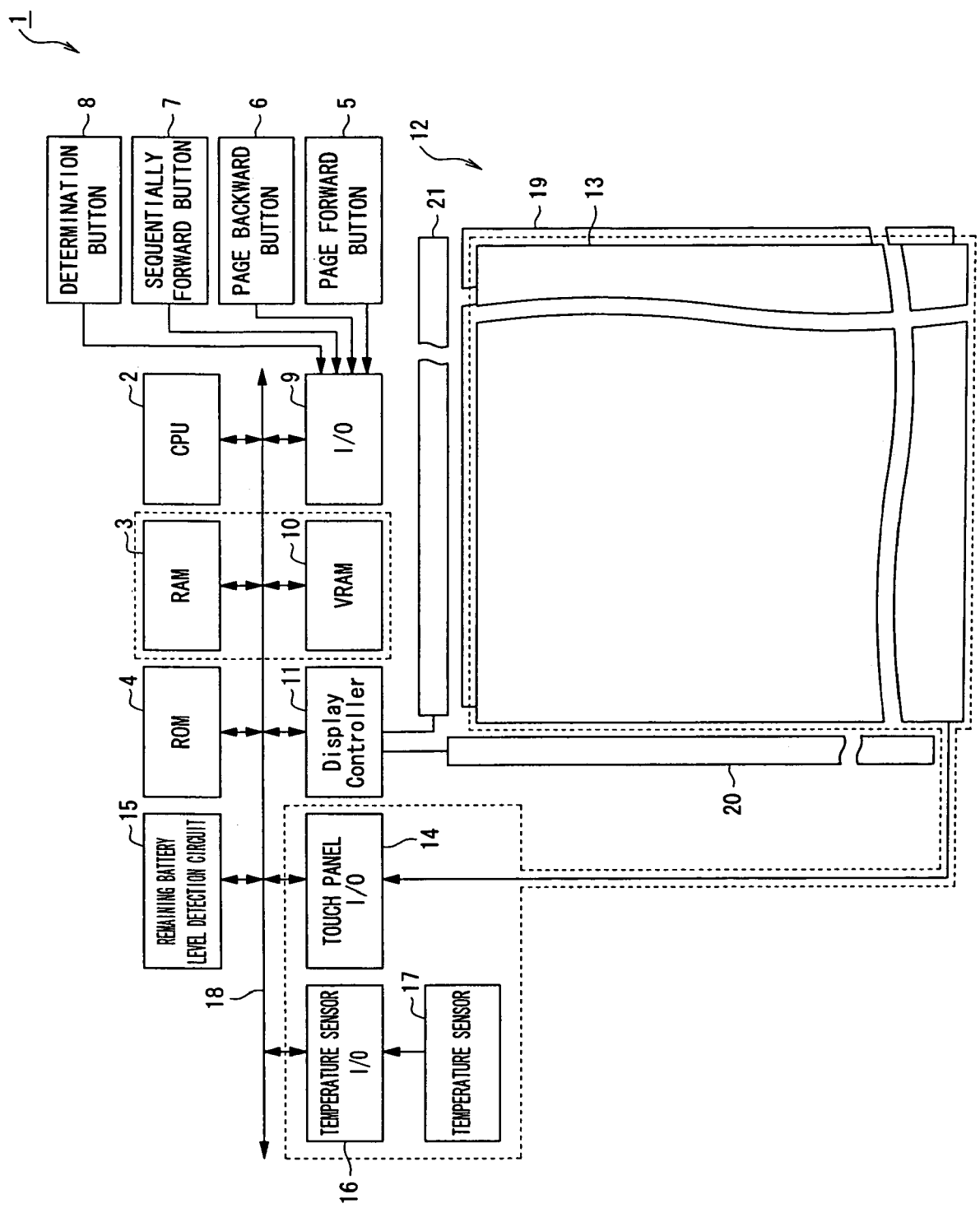
FIG. 8 is a block diagram for illustrating a variation example of the present invention.

Though an example has been shown in which a non-volatile memory is used as the RAM 3, the display device of the present invention is not limited thereto. For example, a volatile memory such as a DRAM may be used, and a dedicated battery for the RAM 3 may be prepared separately from the driving battery of the electronic book reader 1, as shown in FIG. 8. When the dedicated battery is prepared for the RAM 3, the remaining available battery level of the dedicated battery may be displayed on the cholesteric liquid crystal panel 19.

Furthermore, though an example has been shown in which, if a subtraction result obtained by subtracting power consumption required for switchingly displaying remaining pages of contents from a remaining available driving battery level is a predetermined threshold or below, the I/O 9 is inhibited from outputting a page backward signal and outputting a sequentially forward signal, the display device of the present invention is not limited thereto. For example, it may be notified that difference between the remaining available driving battery level and the power consumption is small to attract attention of the user. As a method for making the notification, a notification to the effect may be displayed on the cholesteric liquid crystal panel 19, or it may be displayed on a different sub-display. Alternatively, the notification may be made by voice through a speaker and the like.

Furthermore, though an example has been described in which power consumption for one page is calculated with reference to a predetermined data table, the display device of the present invention is not limited thereto. For example, it is possible that, every time contents corresponding to one page are switchedly displayed, the remaining available driving battery level after the switching display is subtracted from the remaining available driving battery level before the switching display, and the subtraction result is determined as the power consumption for one page. As a method for calculating the remaining available driving battery level before switchingly displaying one page and the remaining available driving battery level after switchingly displaying one page, there is a method in which the remaining available driving battery level before switchingly displaying one page is calculated based on the voltage data which was latched in the voltage data latch 23 before the switching display, and the remaining available driving battery level after switchingly displaying one page is calculated based on voltage data which is latched in the voltage data latch 23 after the switching display.

According to the method for calculating the remaining available driving battery level for one page, a data table may be corrected based on newly calculated power consumption for one page. Thereby, it is possible to appropriately correct scatter of power consumptions of the cholesteric liquid crystal panel 19 and more accurately calculate the number of displayable pages. When the data table is corrected, a mean value between the power consumption for one page which has been stored in the data table and the newly calculated power consumption for one page may be obtained as the correction result. Alternatively, the correction result may be calculated by adding a weight larger than the newly calculated power consumption for one page to the power consumption for one page which has been stored in the data table.

Figure 9:
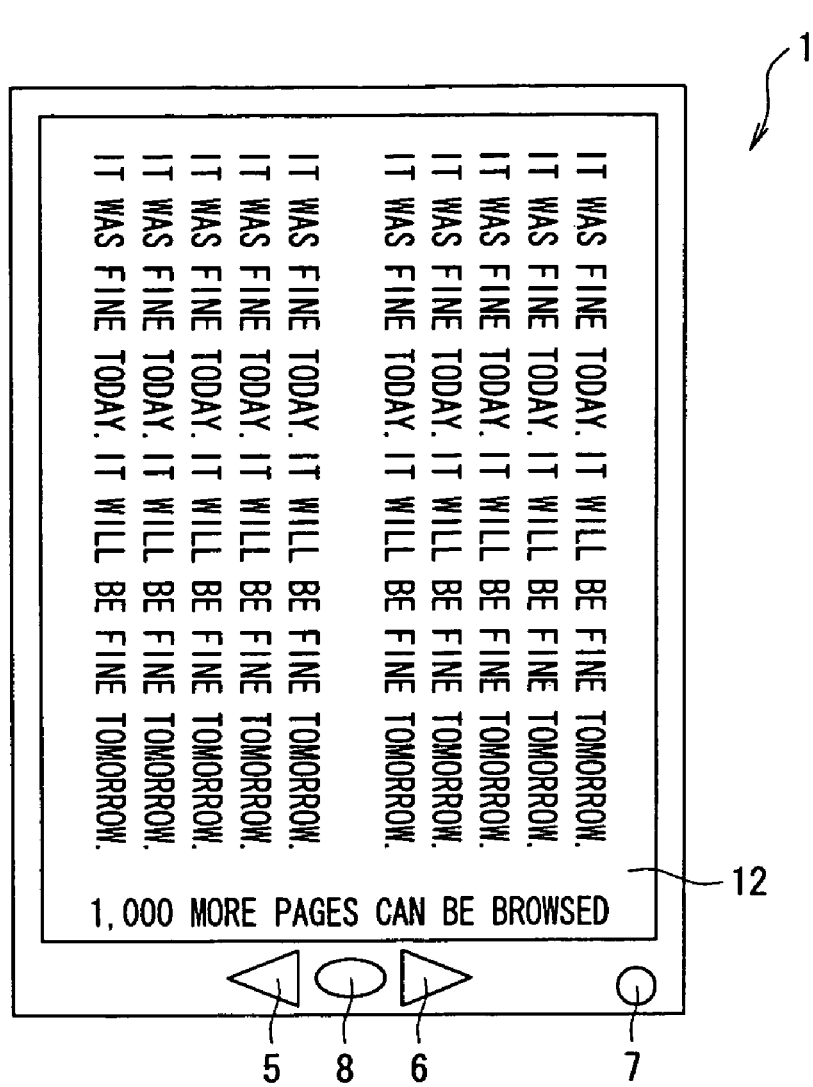
FIG. 9 illustrates a variation example of the present invention.

Furthermore, though an example has been described in which the number of displayable pages is immediately displayed on the cholesteric liquid crystal panel 19, the display device of the present invention is not limited thereto. For example, a predetermined reference number of pages may be set as the number of displayable pages of the electronic book reader 1. For example, if the number of displayable pages is a reference number of pages of 1,000 pages or more, then, as shown in FIG. 9, the following message may be displayed: "More than 1,000 pages can be still browsed." In the case of making a notification when more than the reference number of pages can be switchedly displayed, multiple values of the reference number of pages may be set, for example. That is, 1,000 pages and 500 pages, for example, are set as values of the reference number of pages, and if the number of displayable pages is 1,000 or less, a message of "More than 500 pages can be still browsed" may be displayed instead of the message of "More than 1,000 pages can be still browsed." In this case, after the number of displayable pages is less than the least reference number of pages among the multiple values of the reference number of pages, the number of displayable pages may be displayed immediately, that is, displayed by the page.

Furthermore, though FIG. 5 shows an example of preparing a data table in which the temperature of the cholesteric liquid crystal panel 19 is separated at every 10° C. within a range from 0° C. to 60° C., the display device of the present invention is not limited thereto. For example, a table in which the temperature is separated at every 5° C. may be prepared. In the case of a storage-type display unit in which power consumption for one page is constant below a predetermined temperature and it exponentially changes at or above the predetermined temperature instead of the storage-type display unit in which power consumption for one page linearly changes according to temperature changes of the cholesteric liquid crystal panel 19, the temperature may be roughly separated when the temperature change of the cholesteric liquid crystal panel 19 is below the predetermined temperature and finely separated when it is at or above the predetermined temperature.

Figure 10:
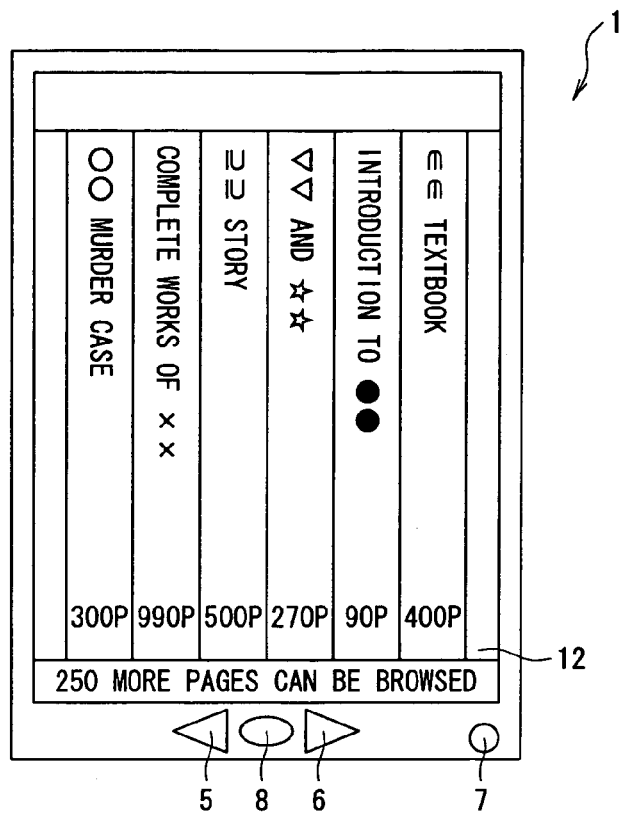
FIG. 10 illustrates a variation example of the present invention.
Figure 11:
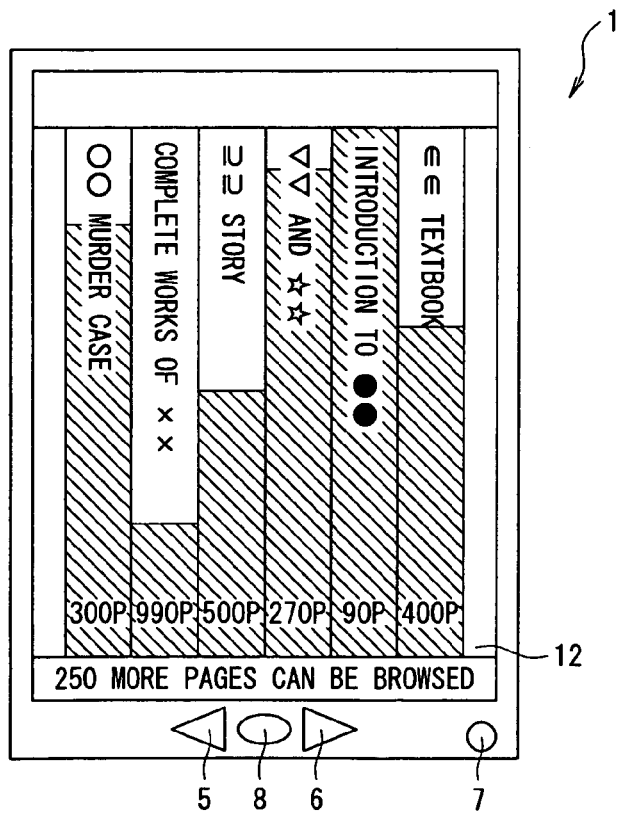
FIG. 11 illustrates a variation example of the present invention.

Furthermore, though an example has been described in which the number of displayable pages is displayed together with contents, the display device of the present invention is not limited thereto. For example, as shown in FIG. 10, the number of displayable pages may be displayed together with an image of spines of books which are selectable contents when a user selects contents to be displayed on the cholesteric liquid crystal panel 19. Thereby, the number of displayable pages can be an indicator for selecting contents. Furthermore, as shown in FIG. 11, there may be displayed a bar graph overlapped on an image of spines of books when contents are selected, each bar of the graph indicating the percentage of the number of displayable pages included in corresponding contents. Thereby, it is possible for the user to know what percentage of contents he can read with the current remaining available driving battery level, and the bar graph can be a more easily understandable indicator for selecting contents. If there is no such contents as can be completely read with the remaining available driving battery level, it is possible, for example, to select such contents that battery is exhausted at the middle part thereof rather than such contents that battery is exhausted at the end part thereof. That is, it is possible to prevent a user from feeling frustration that he cannot finish reading it due to battery exhaustion in spite of having read the contents almost to the end.

What is claimed is:

1. A display device driven with a remaining battery level, for switchingly displaying each page of contents to be displayed on a storage-type display unit capable of holding contents which have been displayed thereon even if a power supply thereto is stopped, the display device comprising:
    a remaining battery level detection section for detecting a remaining battery level; and
    a notification section for notifying a correspondence relation between the detected remaining battery level and a number of displayable pages of the contents,
    wherein the notification section calculates power consumption required for switchingly displaying remaining pages of contents displayed on the storage-type display unit and makes the notification based only on the caculated power consumption required for switchingly displaying the remaining pages of content and the remaining battery level detected by the remaining battery level detection section by:
    sequentially generating raster data of contents of the page next to the contents displayed on the display device,
    causing the raster data to be sequentially stored, and
    referring to a data table in which values of power consumption for one page are set according to temperatures of a cholesteric liquid crystal panel and driving method.

2. The display device according to claim 1, wherein the notification section notifies a user of the correspondence relation when the user selects contents to be displayed on the storage-type display unit.

3. The display device according to claim 1, wherein, when a value obtained by subtracting the calculated power consumption from the remaining battery level detected by the remaining battery level detection section is a predetermined threshold or below, the notification section makes a notification to that effect.

4. The display device according to claim 1, comprising a display operation limiting section for enabling switching display from a page displayed on the storage-type display unit only to the next page when the value obtained by subtracting the calculated power consumption from the remaining battery level detected by the remaining battery level detection section is a predetermined threshold or below.

5. The display device according to claim 3, comprising a display operation limiting section for enabling switching display from a page displayed on the storage-type display unit only to the next page when the value obtained by subtracting the calculated power consumption from the remaining battery level detected by the remaining battery level detection section is a predetermined threshold or below.

6. The display device according to claim 1, wherein the notification section calculates a maximum number of pages to be switchedly displayed on the storage-type display unit, based on the remaining battery level detected by the remaining battery level detection section and makes the notification based on the maximum calculated number of pages.

7. The display device according to claim 6, wherein, when the calculated number of pages is a reference number of pages or larger, the notification section makes a notification that a certain reference number had been calculated.

8. The display device according to claim 7, wherein it is possible to set multiple values of the reference number of pages.

9. The display device according to claim 8, wherein, when the calculated number of pages is smaller than a smallest reference number of pages among the multiple values of the reference number of pages, the notification section immediately notifies the calculated number of pages.

10. The display device according to claim 6, comprising a power consumption calculation section for calculating power consumed by the switching display, based on change in the remaining battery level detected by the remaining battery level detection section, wherein the notification section calculates the number of pages to be switchedly displayed on the storage-type display unit, based on the remaining battery level detected by the remaining battery level detection section and the calculated power consumption calculated by the power consumption calculation section.

11. A display device driven with a remaining battery level, for switchingly displaying each page of contents to be displayed on a storage-type display unit, the display device comprising:
    a remaining battery level detection section for detecting a remaining battery level; and
    a notification section for notifying a correspondence relation between the detected remaining battery level and number of displayable pages of the contents,
    wherein the notification section calculates the number of pages to be switchedly displayed on the storage-type display unit based only on the remaining battery level detected by the remaining battery level detection section and a data table showing the relation between power consumption and a method of driving the storage-type display unit by:
    sequentially generating raster data of contents of the page next to the contents displayed on the display device,
    causing the raster data to be sequentially stored, and referring to the data table in which values of power consumption for one page are set according to temperatures of a cholesteric liquid crystal panel and driving method.

12. A display device driven with a remaining battery level, for switchingly displaying each page of contents to be displayed on a storage-type display unit, the display device comprising:
a remaining battery level detection section for detecting a remaining battery level;
a notification section for notifying a correspondence relation between the detected remaining battery level and number of displayable pages of the contents; and
a temperature detection section for detecting temperature of the storage-type display unit,
wherein the notification section calculates the number of pages to be switchedly displayed on the storage-type display unit based only on the remaining battery level detected by the remaining battery level detection section and the temperature detected by the temperature detection section by:
sequentially generating raster data of contents of the page next to the contents displayed on the display device,
causing the raster data to be sequentially stored, and
referring to a data table in which values of power consumption for one page are set according to temperatures of a cholesteric liquid crystal panel and driving method.

13. The display device according to claim 1, comprising a battery for a particular circuit for supplying power to a particular circuit the power consumption of which changes with operation time and a battery used for the switching display, wherein the remaining battery level detection section detects a remaining level of the battery used for the switching display.

14. The display device according to claim 1, wherein a non-volatile memory is used as a memory for storage of data generated by a control process of the display device.

15. The display device according to claim 1, comprising a CPU for executing a display operation limiting process, wherein a data table is referenced, the power consumption for one page is calculated based on the temperature, the number of remaining pages of the displayed contents is multiplied by the power consumption required for rewriting one page, a multiplication result is determined as the power consumption required for displayed remaining pages, if a subtraction result obtained by subtracting the power consumption required for displaying remaining pages from the remaining available driving battery level is a predetermined threshold or below, an inhibiting signal is outputted to an I/O, the I/O determines whether an inhibiting signal is outputted from the CPU, and if the inhibiting signal is not outputted, the I/O outputs a page backward signal to the CPU in response to the page backward button being pressed, and outputs a sequentially forward signal to the CPU in response to the sequentially forward button being pressed, and if the inhibiting signal is outputted, output of a page backward signal and output of a sequentially forward signal are inhibited.

16. The display device according to claim 1, wherein the data table is correctable based on the calculated power consumption required for switchingly displaying the remaining pages of content which is at least one of:
newly calculated power consumption for one page;
a mean value between the power consumption for one page which has been stored in the data table; and
newly calculated power consumption for one page
and the calculated power consumption required for switchingly displaying the remaining pages of content may be calculated by adding a weight larger than the newly calculated power consumption for one page to the power consumption for one page which has been stored in the data table.

* * * * *